T. J. MERONEY.
Plow.
No. 162,760.
Patented May 4, 1875.
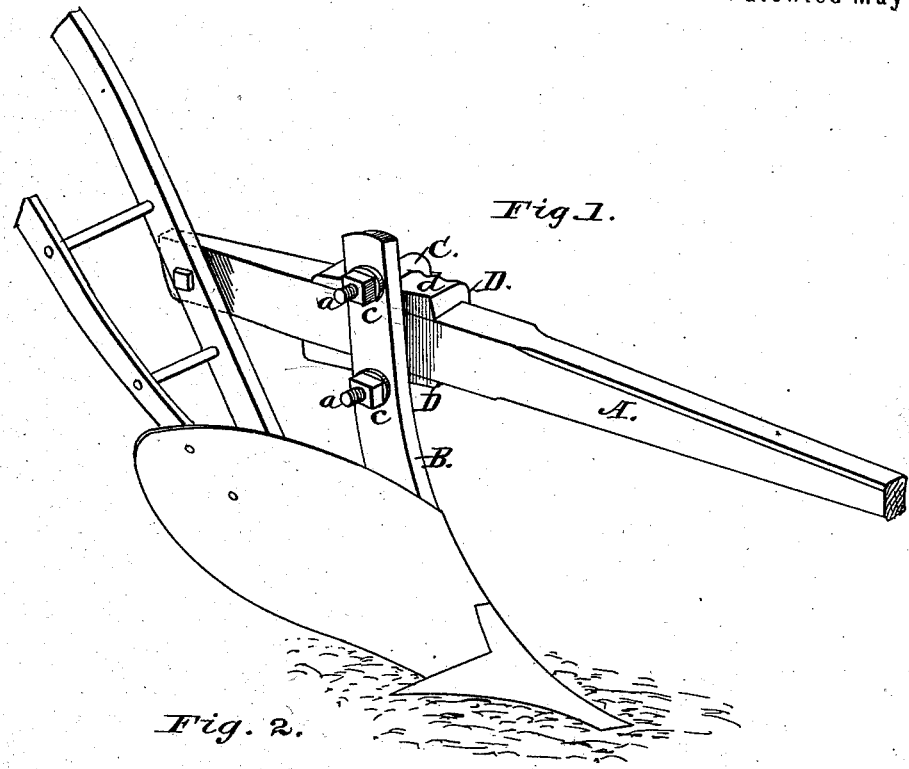
Fig. 1.
Fig. 2.
Fig. 3.
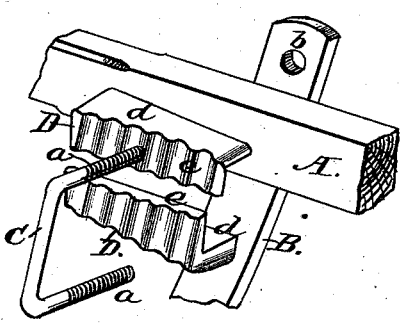
Fig. 4.
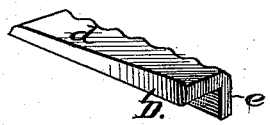
Attest:
A. H. Norris.
Joseph C. Wildman
Inventor.
Thomas J. Meroney
By James L. Norrie
Atty.
THE GRAPHIC CO. PHOTO-LITH. 39 & 41 PARK PLACE, N.Y.

UNITED STATES PATENT OFFICE.

THOMAS J. MERONEY, OF SALISBURY, NORTH CAROLINA.

IMPROVEMENT IN PLOWS.

Specification forming part of Letters Patent No. 162,760, dated May 4, 1875; application filed April 13, 1875.

*To all whom it may concern:*

Be it known that I, THOMAS J. MERONEY, of Salisbury, in the county of Rowan and State of North Carolina, have invented certain new and useful Improvements in Plows, of which the following is a specification:

My invention relates to that class of plows in which the plowshare is attached to a standard connected at its upper end to the beam, so that the standard can be adjusted along the latter in order to cause the plowshare to enter the ground to a greater or less degree, and plow shallow or deep, as may be required.

My invention has for its object to construct the adjusting device for the plowshare in such manner that the beam of the plow is raised or lowered in order to cause the share to enter the ground deep or shallow, whereby no movement of the plowshare-standard is required, and the handles retain their usual position or pitch, and, moreover, the strength of the plow-beam is greatly increased. To this end my invention consists in the employment, with the usual U-shaped link or cuff embracing the plow-beam, and to which the standard carrying the plowshare is attached, of two right-angular blocks, each of which has one of its flanges tapering or wedge-shaped, and the remaining flange being provided with vertical grooves or notches, the said angular blocks or wedges being arranged with their wedge-shaped flanges reversely toward each other between the upper and lower edges of the beam and the link or cuff, in such manner that the cuff or link will rest in some one of the notches or grooves in such blocks, and so that by adjusting the latter toward or from each other the plow-beam will be raised or lowered according to the distance the wedges are moved. The tapering or wedge-shaped flanges of the blocks overlap the upper and lower edges of the beam, and thereby impart to and increase the strength of said beam; and, moreover, the cuff or link is retained out of contact with any portion of the beam, and wear of the latter prevented, all of which will be hereinafter fully described.

Referring to the accompanying drawings, Figure 1 represents a perspective view of a plow embodying my invention, and Figs. 2 and 3 perspective views of the opposite side of the plow, and Fig. 4 a view of one of the angular blocks.

The letter A represents the beam of the plow, which is pivoted at or near its rear extremity to one of the handles, or it may be pivoted to a bolt or pin connecting the handles. B represents the standard, to which the usual or any preferred plowshare is attached, and which standard is connected with or clamped to the side of the plow-beam by means of a U-shaped gripe link or cuff, C, the screw-threaded ends *a a* of which are passed through openings *b b* in the upper end of the standard, and secured in place by nuts *c* applied to the said screw-threaded ends of the link. D D represent the angular blocks, which are each constructed with a tapering or wedge-shaped flange, *d*, and a grooved or notched flange, *e*, and said blocks are arranged between the cuff or link and the plow-beam, so that the said link may lie in some one of the grooves or notches in the said flanges *e*.

In order to elevate or lower the plow-beam to cause the plowshare to enter the earth to a greater or less degree for plowing shallow or deep, it is only necessary to loosen the cuff or link, adjust or move the angular blocks toward or from each other to the required degree, and then tighten the cuff, and, through the medium of the reversely-arranged wedge-shaped flanges, the object is attained, this result being due to the fact that one wedge will act to press one end of the beam down, while the other wedge acts to press the opposite end up, the fulcrum of both wedges being the link or cuff, and thereby the draft on the plow-share-standard is regulated.

It will, of course, be apparent that if the beam be elevated the plowshare will enter the ground to a limited degree, while for every adjustment of the beam in a downward direction the plowshare will be caused to enter the ground more and more.

The series of grooves serve as graduations upon the beam in order to indicate the degree of adjustment it is desired to impart to the beam.

By the means described it is not necessary to adjust the plow-share standard, and I also avoid the pitch or position of the handles being changed. The adjustment of the share is more reliable and effective, and possesses many advantages, which will be apparent.

It will be observed that by the use of the angular blocks the same overlap the upper and lower edges of the beam, and thereby the strength of the beam is greatly increased, and, moreover, the cuff or link is retained out of contact with the beam, and thereby wear of the latter is avoided, which occurs when the cuff is in contact with the upper and lower edges of the plow.

The angular blocks can be constructed of any material suitable for the occasion, but, for the sake of cheapness, I prefer to cast them from metal.

Having thus described my invention, what I claim, and desire to secure by Letters Patent, is—

The flanged and notched wedges covering the upper and lower angles of the beam opposite the standard, in combination with the standard, beam, and cuff or gripe, as shown and described.

In testimony that I claim the foregoing I have hereunto set my hand.

THOMAS J. MERONEY.

Witnesses:
   JOS. L. COOMBS,
   A. H. NORRIS.